Aug. 20, 1957   J. H. WILSON   2,803,474
QUICK DETACHABLE JOINTS
Filed Jan. 21, 1953   2 Sheets-Sheet 1
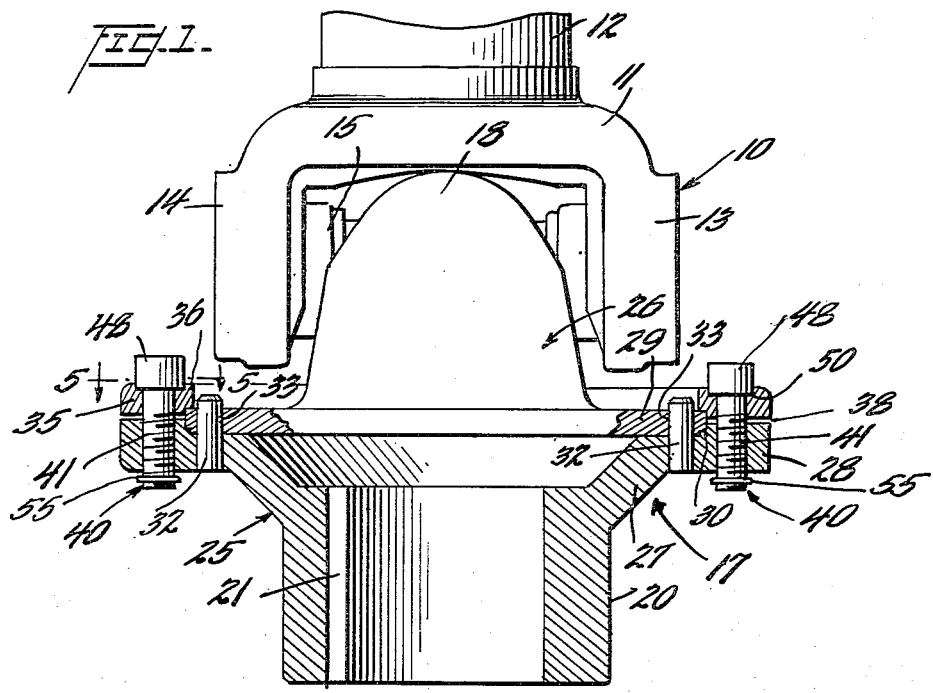
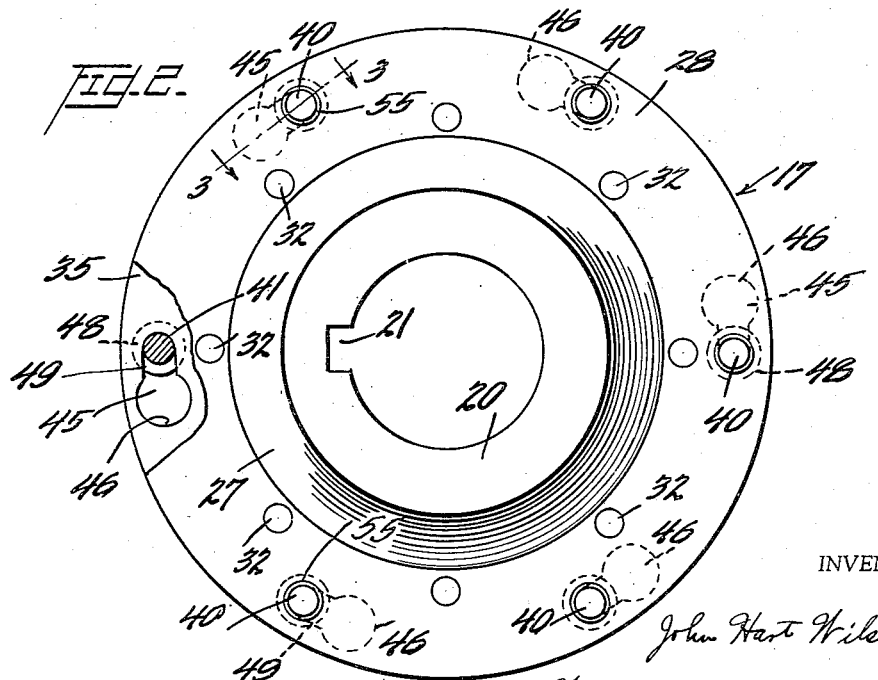
INVENTOR
John Hart Wilson
BY Watson, Cole, Grindle & Watson
ATTORNEYS

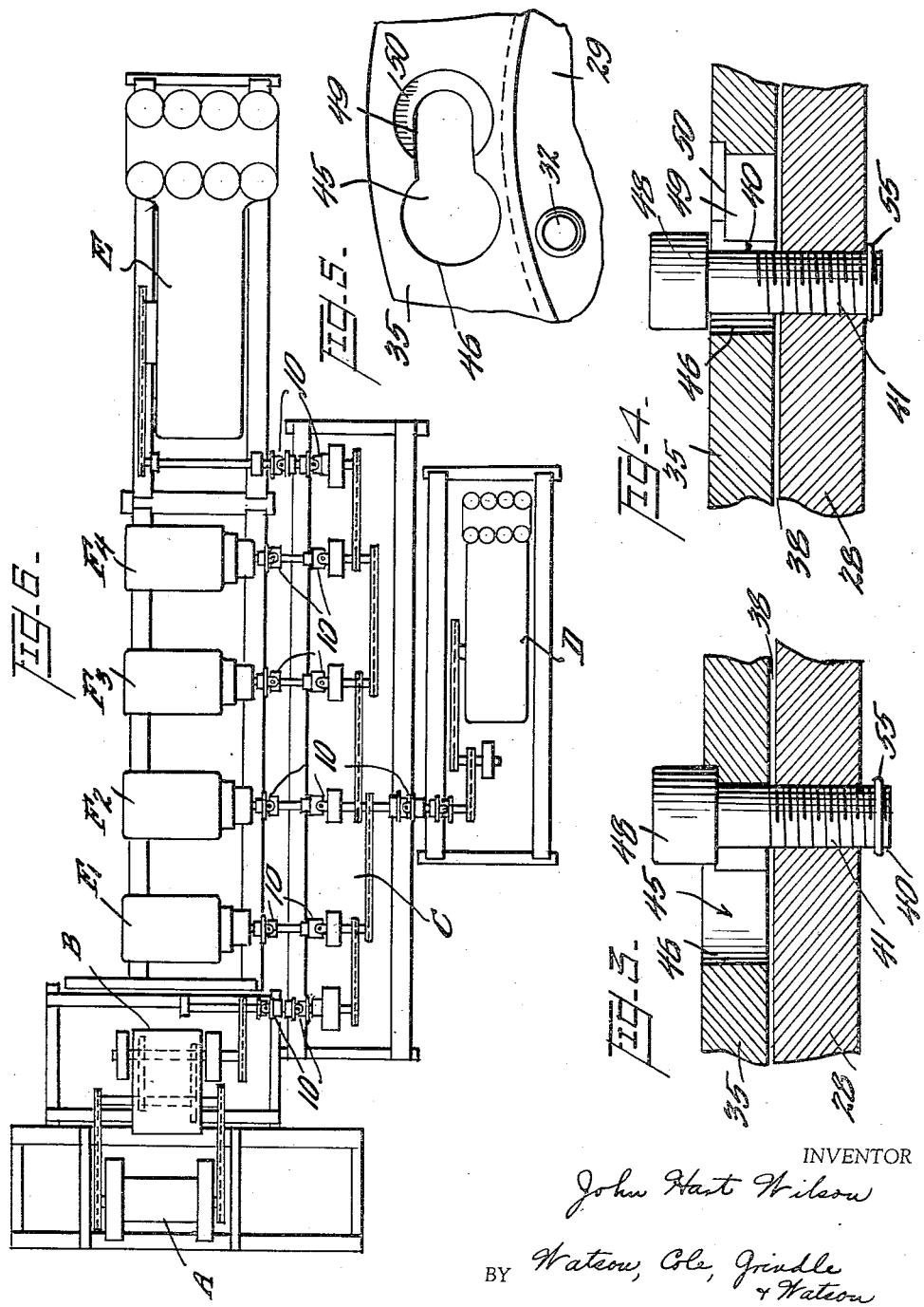

United States Patent Office 2,803,474
Patented Aug. 20, 1957

2,803,474

QUICK DETACHABLE JOINTS

John Hart Wilson, Wichita Falls, Tex.

Application January 21, 1953, Serial No. 332,440

1 Claim. (Cl. 287—129)

This invention relates to quick-detachable connections for power transmission shafts, and more particularly to such connections in association with Cardan joints or other universal joint arrangements.

The general object of the invention is to provide a novel and improved joint or connection of the class described which is simple in construction and application and which greatly facilitates installation, adjustment, and dismantling of complicated and heavy power and transmission installations such as for example, those encountered in the oil well drilling field.

In its preferred embodiments the invention contemplates the provision of a universal joint driving connection, for example, between two shafts, one of which is rotated by a source of power and the other connected to a driven member. Ordinarily, the forked or yoke elements of the universal joint are keyed, splined, or socketed onto the shaft ends and, when the necessity arises to disconnect the joint or coupling, certain difficulties are experienced. It is usually not feasible to back off one or both of the shafts axially and therefore provision has been made for dividing one or both of the two members of the joint into two parts, preferably flanged, the flanges being bolted or pinned together for rotation as a unit. In order to transmit the great torque as required, for example, in the rotary unit, pump, and winch drives of oil rigs, a number of such bolt or pin fastenings are required in each coupling, and in multiple engine installations quite a large number of universal joints must be utilized.

It is therefore an important object of the invention to provide a readily disconnectable universal joint installation which embodies a quick-coupled driving flange device, whereby the coupling and uncoupling of the joint may be greatly facilitated, most of the several parts being maintained in attached or assembled relationship when the joint is uncoupled, thus minimizing the probability of loss or misplacement of such parts.

Other objects and features of novelty will be apparent from the following specification when read in connection with the accompanying drawings in which one embodiment of the invention is illustrated by way of example.

In the drawings:

Figure 1 is a view partially in plan and partially in horizontal longitudinal section of a universal joint of the Cardan type which embodies the principles of the invention;

Figure 2 is a view in elevation of the joint as seen from the bottom of Figure 1;

Figure 3 is a fragmentary sectional view of a detail of a flange gripping connection for effecting the driving engagement of the two parts of one of the joint members, the arrangement being in assembled and locked position;

Figure 4 is a similar view of the same detail in unlocked position ready for disassembling of the parts;

Figure 5 is a fragmentary face view of the flange clamping means with the bolt removed, such as seen from line 5—5 of Figure 1, or from the top of either Figures 3 or 4; and Figure 6 is a diagrammatic view of a universal joint driven drilling rig with four engines, two pump drives, and an independent rotary unit, in which are employed a great number of the quick-detachable units forming the particular subject matter of the present invention.

The present invention, whereby quick-detachable driving connections are provided in conjunction with universal joint driving couplings, is of course applicable to a wide variety of installations, but in order to demonstrate the need for a quick-detachable joint of this character there has been illustrated in a very diagrammatic way, in Figure 6 of the drawings, an oil well drilling rig combination in which a very large number of these joints are provided. In this installation, the reference character A designates the winch or winding drum assembly; B indicates a clutch and chain drive arrangement; C denotes a driving transmission assembly whereby power is taken from a plurality of engines and distributed to a plurality of driven instrumentalities; D designates a mud pump of moderate capacity; E indicates a mud pump of considerably larger power; and $F_1$, $F_2$, $F_3$ and $F_4$ show a battery of four engines supplying the power for the rig and its associated units.

The novel quick-detachable universal joint coupling is designated generally by the reference numeral 10 and the occurrences of these multiple units is so indicated in Figure 6. As the description of the details of the coupling unfolds, it will be realized how economies are effected both in time and effort in coupling and uncoupling the universal joints as shown in Figures 1 and 2 of the drawings. Each of the couplings designated 10 involves a Cardan joint one element 11 of which comprises a shank 12 which is suitably connected to one of the shafts or other rotatable parts which are to be coupled, and a fork the arms of which are indicated at 13 and 14; the cross member or X-member with its four radial arms is indicated and partly shown at 15 in the figure; and it will be thoroughly understood by those skilled in the art that this element has bearings at its ends which form pivotal connections for the two forks of the connected yoke members. One of the bearing ends of the fork of the second yoke member 17 of the joint is indicated at 18, while the shank portion or socket of this member is shown in section at 20, a spline slot 21 being provided for connecting the shank or socket to the other shaft member.

The specific novelty of the invention is found in the construction of the part 17 of the joint, but could of course be applied to the part 11 instead or in addition to the provision in part 17.

The yoke member 17 is divided essentially into two principal parts, the shank or socket portion 25 and the fork member 26. The member 25 is flared or conical at an intermediate portion 27 and provided with a radial flange 28 which is applied, in operative position, in face to face contact with the radial flange 29 of the fork 26. The flange 28 is of considerably greater diameter than the flange 29 and has an axial extension or thickened portion at its radially outward periphery whereby the inner flange 29 is embraced by the outer flange 28, the two flanges interfitting at the shouldered portions 30.

In order to provide positive and sturdy driving connections between the two flanges, a circular series of pins 32 are fixed in the flange 28 and are provided with chamfered ends whereby they may be readily inserted in openings 33 in the flange 29.

In order to maintain the flanges 28 and 29 of the two parts of the coupling member 17 in snug face to face relationship, there is provided an annular clamping element or ring 35, this ring adapted to cooperate with the outer thickened portion of the flange 28 and provided with an inward projection 36 overlying the periphery of the inner flange 29 opposite the shouldered portion 30 of the larger flange 28. The thickness of the ring 35 and of the flange 28 as related to the thickness of the flange 29 is such that the main portions of the ring 35 and flange 28 are spaced very slightly apart as indicated at 38 so that the flange 36 will clamp the periphery of the flange 29 firmly against the face of the flange 28.

In order to exert clamping pressure upon the ring 35, there are provided a series of headed studs or bolts 40, the shank portions 41 being screwed into threaded openings at intervals around the periphery of the outer extended portion of the flange 28. Around the circumference of the ring 35 there are provided keyhole slots 45 the larger portions 46 of which are of a very slightly greater diameter than the heads 48 of the studs or bolts 40. The narrower portions 49 of the keyhole slots 45 are only slightly greater than the shank portions 41 of the studs 40. The keyhole slots 45 are arranged to extend circumferentially of the ring 35 whereby upon rotation of the ring the keyhole slots move with respect to the several bolts 40 so that the bolts may occupy either the smaller or the larger portions of the slots. These relatively shifted positions of the rings and slots with respect to the studs or bolts 40 are graphically illustrated in Figures 3 and 4 of the drawings. In these figures also it will be seen that the narrower portion 49 of the keyhole slot 45 is countersunk as at 50, this countersunk portion being circular as clearly shown in Figure 5 of the drawings so that when the headed stud or bolt 40 is screwed home the head 48 will fit within the portion 50 and secure the ring against inadvertent rotation. This clamped position of the bolt and ring is the one which the parts occupy in Figure 3 of the drawings.

Inu order to prevent complete removal of the bolts or studs 40, a ring or sleeve 55 is permanently fixed to the shank portion 41 of each bolt near its outer end. The positioning of this locking ring 55 is such that it permits the loosening or withdrawal of the stud or bolt 40 to the extent indicated in Figure 4 of the drawings where it has cleared the outer surface of the ring 35 so that upon rotation of the ring the slot is moved circumferentially so that the larger portion 46 surrounds the head 48 of the bolt and the ring 35 can be completely removed so as to permit the flanges 28 and 29 to be separated sufficiently to release the driving connection of the keying pins 32.

It will be readily seen that the application and detachment of the parts of the joint may be effected much more readily than if a half-dozen bolts in each coupling had to be completely removed in order to release the flanges. Not only is the likelihood of the bolts being lost obviated, but the releasing of the device may be effected by a very few turns of each bolt, the axial movement of the bolts or studs needing only to be such as to clear the countersunk portion 50; and very obviously in cases where it is not felt necessary to lock the ring 35 against inadvertent rotary movement, the depressed or countersunk shoulder portion 50 may be eliminated and the bolt heads 48 clamped directly upon the outer face of the ring 35.

As indicated before, in installations such as shown in Figure 6 of the drawings, where a great number of these joints are employed, many man hours of time may be saved by the utilization of quick-detachable joints of this character, as well as providing the assurance that the bolts will not become misplaced and lost when the coupling is disassembled.

Various changes and modifications may be made in the embodiment of the invention illustrated and described herein without departing from the scope of the invention as defined by the following claim.

Having thus described the invention, what is claimed as new and desired to be secured by Letters Patent is:

A joint adapted to couple two rotatable elements such as driving and driven shafts or the like, comprising two parts each provided with a radial flange, said flanges meeting in face to face contact, one of said flanges being of greater diameter than the other and overlapping it radially, a clamping ring overlying the peripheral margin of the second named flange and the radial extension of the first named flange, at least one keyhole slot extending through said ring and at least one headed stud secured to the extension of the first named flange and adapted to pass through the keyhole slot in the ring, the head of the stud being of less diameter than the larger portion of the keyhole slot and of greater diameter than the smaller portion, whereby rotation of the ring from a position where the stud passes through the smaller portion of the slot to a position where it passes through the larger portion will permit the removal of the clamping ring axially and release the second named flange, said studs normally being threaded into said first named flange through the smaller portion of the keyhole slots in the second named flange, and normally causing the ring to clamp the second named flange firmly against the first named flange, to establish a frictional rotary driving connection between said flanges, and keying means between the two flanges affording a sturdy positive driving connection between the two flanges when they are applied face to face.

References Cited in the file of this patent

UNITED STATES PATENTS

| | | |
|---|---|---|
| 879,176 | Jackson | Feb. 18, 1908 |
| 1,479,583 | Carey | Jan. 1, 1924 |
| 1,637,944 | Keller | Aug. 2, 1927 |
| 1,712,049 | Robb | May 7, 1929 |
| 1,808,222 | Hild | June 2, 1931 |
| 1,950,207 | Anderson | Mar. 6, 1934 |
| 2,168,126 | Kane | Aug. 1, 1939 |
| 2,250,448 | Edwards | July 29, 1941 |
| 2,259,657 | Padgett | Oct. 21, 1941 |
| 2,380,646 | Harrington | July 30, 1945 |
| 2,576,872 | Young | Nov. 27, 1951 |
| 2,707,618 | Brown | May 3, 1955 |

FOREIGN PATENTS

| | | |
|---|---|---|
| 457,418 | Great Britain | of 1936 |